United States Patent
Pode

(10) Patent No.: US 6,840,050 B2
(45) Date of Patent: Jan. 11, 2005

(54) THERMAL JACKET FOR BATTERY

(75) Inventor: Jacob Pode, Hof Ashkelon (IL)

(73) Assignee: Polyrit, Hof Ashkelon (IL)

( * ) Notice: Subject to any disclaimer, the term of this patent is extended or adjusted under 35 U.S.C. 154(b) by 0 days.

(21) Appl. No.: 10/486,255

(22) PCT Filed: Jul. 9, 2002

(86) PCT No.: PCT/IL02/00555
§ 371 (c)(1),
(2), (4) Date: Feb. 9, 2004

(87) PCT Pub. No.: WO03/015192
PCT Pub. Date: Feb. 20, 2003

(65) Prior Publication Data
US 2004/0194489 A1 Oct. 7, 2004

(30) Foreign Application Priority Data
Aug. 9, 2001 (IL) .................................. 144832

(51) Int. Cl.$^7$ .............................................. F25B 21/02
(52) U.S. Cl. .................... 62/3.61; 62/239; 62/259.2
(58) Field of Search .......................... 62/3.2, 3.61, 239, 62/243, 244, 259.2; 180/68.2

(56) References Cited
U.S. PATENT DOCUMENTS 4,007,315 A * 2/1977 Brinkmann et al. .......... 429/62
5,320,190 A * 6/1994 Naumann et al. .......... 180/68.2
5,490,572 A * 2/1996 Tajiri et al. ................. 180/65.1
5,510,207 A * 4/1996 Grivel et al. ................ 429/120
5,557,941 A * 9/1996 Hanson et al. ................. 62/160
5,937,664 A    8/1999 Matsuno et al.
6,042,961 A    3/2000 Verhoog et al.
6,138,466 A   10/2000 Lake et al.

FOREIGN PATENT DOCUMENTS

DE         19648353      5/1998
EP          0676818     10/1995

* cited by examiner

Primary Examiner—Melvin Jones
(74) Attorney, Agent, or Firm—Nath & Associates PLLC; Gary M. Nath; Marvin C. Berkowitz

(57) ABSTRACT

A thermal jacket adapted to accommodate and cool a storage battery placed in the engine compartment of an automobile and exposed to heat at elevated temperatures emanating from the engine. The walls of the rectangular jacket are formed of rigid, foam-plastic material which thermally isolate the battery from the engine. Embedded in a wall of the jacket is a heat exchanger in which there is circulated a refrigerant fluid derived from the air conditioner installed in the vehicle. The heat exchanger acts to cool the battery to maintain the temperature of the electrolyte therein at a level at which the battery operates at optimal efficiency.

9 Claims, 1 Drawing Sheet

Polyrit
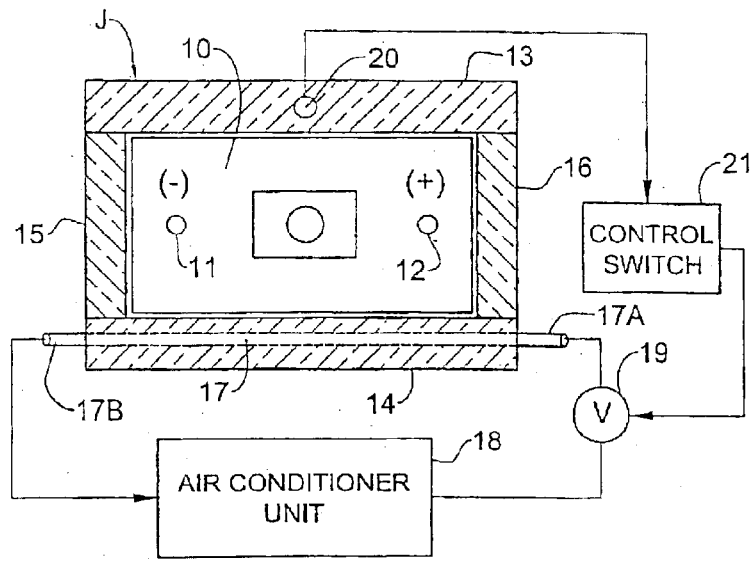
FIG. 1
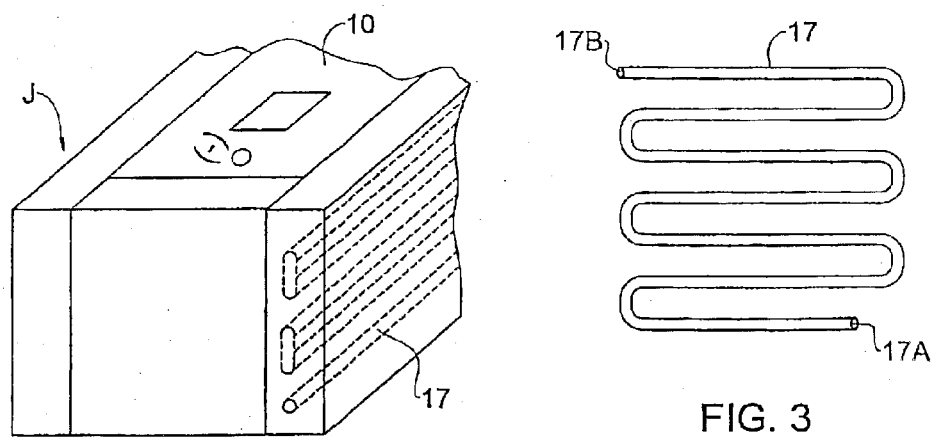
FIG. 2
FIG. 3
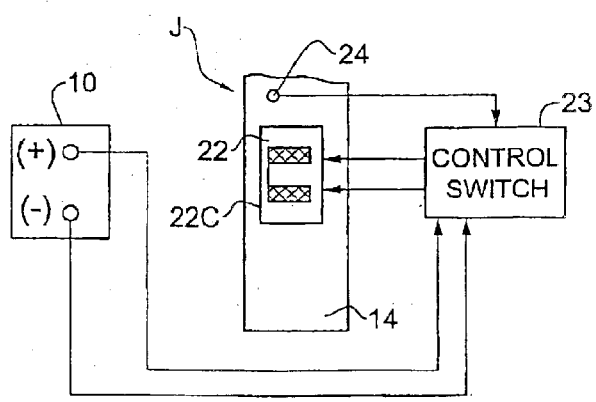
FIG. 4

THERMAL JACKET FOR BATTERY

FIELD OF THE INVENTION

This invention relates generally to a storage battery installed in the engine compartment of an automobile where it is exposed to heat at an elevated temperature emanating from the engine, and in particular to a thermal jacket for accommodating and cooling the battery to cause it to operate efficiently.

BACKGROUND OF THE INVENTION AND STATUS OF PRIOR ART

In the typical automobile propelled by an internal combustion engine, there is placed in the engine compartment adjacent the engine a rechargeable storage battery. This battery supplies dc power for starting the car, for energizing the car lights and for powering other devices requiring dc power.

Because of the close proximity of the battery to the engine, it is exposed to heat at an elevated temperature emanating from the engine. When the engine has been operating for several hours, the heat of the engine developed during this period and transferred to the storage battery may impair its operation.

A conventional rechargeable storage battery for an automobile is identified as a lead-acid battery. The reason for this denomination is that the electrolyte of the battery is an acid and its plates are largely formed of a lead-based composition. The positive active electrode material of the battery is lead peroxide and the negative active electrode material is lead sponge.

When these electrodes are immersed in a sulfuric acid electrolyte ($H_2SO_4$—$H_2O$), an electromotive force (EMF) is then developed between the electrodes. In an auto storage battery, each cell thereof produces a nominal voltage of 2 volts. Since the battery must provide a 12 volt output, it includes six 2 volt cells connected in a series. However, the voltage yielded by each storage battery cell is not exactly 2 volts but varies as a function of the concentration of the sulfuric acid electrolyte and its temperature.

As noted in the section "Storage Battery" in Vol. 17 page 443 of the McGraw-Hill Encyclopedia of Science and Technology, when the concentration of the storage battery electrolyte is 1200 spgr and the electrolyte temperature is at 25° C. (77° F.), then the cell voltage is 2.050V. But when at the same temperature, the acid concentration is 1300 spgr, then the output voltage of the cell increases to 2.148V.

Variations in the temperature of the electrolyte give rise to less dramatic changes in the cell voltage. Thus a small change in the temperature of the electrolyte produces only a slight change in cell output voltage in the millivolts range. However, should the electrolyte in a battery placed in the engine compartment of an automobile undergo a steep rise in temperature because of intense heat emanating from the engine, then the output of the battery cell may is fall below 2 volts. This results in a drop in the output voltage of the multi-cell battery so that it is then below its nominal 12 volt value. As a consequence, the battery in this overheated condition may be unable to carry out all of its assigned tasks.

One could try to prevent the electrolyte in a storage battery placed in an engine compartment from overheating by enveloping the battery in a thermal jacket composed of thermal insulation material. But in the environment of an auto engine compartment, a thermal jacket can only function to slow down the rate of heat transfer from the engine to the battery. It cannot prevent a gradual increase in electrolyte temperature resulting from prolonged operation of the engine in the course of which the battery is subjected to heat at high temperature levels.

In the context of a thermal jacket worn by an individual to keep his body warm in a cold environment, the jacket then functions to reduce the loss of heat from the body whose temperature is internally regulated so that it normally is at a temperature of about 37° C. But a storage battery is not internally heated nor cooled. If, therefore, one wishes to prevent a storage battery in the environment of an automobile engine compartment from overheating, it then becomes necessary to cool the battery.

It is known in the prior art to cool the battery of a vehicle to prevent it from overheating. Thus U.S. Pat. No. 5,937,664 to Takayoshi et al. (1998) discloses a battery cooling system for a vehicle whose passenger compartment is cooled by an air conditioner. The vehicle battery is placed in a separate chamber and there cooled by air drawn by a cooling fan from the air-conditioned passenger compartment and blown into the battery chamber.

The practical drawback to this arrangement is that it makes it necessary to create a special chamber for the battery as well to provide an air circulating system between this chamber and the passenger compartment.

SUMMARY OF THE INVENTION

In view of the foregoing, the main object of this invention is to provide a thermal jacket for an automobile storage battery which acts to cool the battery so as to maintain the temperature of its electrolyte at a level at which the battery operates at optimal efficiency.

More particularly, an object of this invention is to provide a jacket of the above type whose walls are formed of closed-cell polyurethane foam material having a high degree of thermal resistance whereby transfer of heat from the battery to the engine compartment and vice versa is minimized, and the temperature of the electrolyte in the battery is mainly regulated by a coolant flowing through the thermal jacket.

Among the advantages of a jacket in accordance with the invention are the following:

A. The thermal jacket which accommodates and cools the car battery does not significantly enlarge the space requirements for the battery in the engine compartment. Hence no difficulty is experienced when installing the jacket in the existing space for the battery.

B. The thermal jacket is formed by four walls of synthetic foam plastic material joined together to create a rectangle, which rectangle can easily be fabricated at a relatively low cost.

C. The jacket incorporates in one of its walls a heat exchanger through which flows a coolant derived from the existing air conditioner in the vehicle. Hence this arrangement does not substantially add to the cost of the installation.

D. The thermal jacket improves the performance of the battery and prolongs its effective life.

Briefly stated, these objects are attained in a thermal jacket adapted to accommodate and cool the storage battery placed in the engine compartment of an automobile and exposed to heat at elevated temperatures emanating from the engine. The walls of the rectangular jacket are formed of rigid foam plastic material which thermally insulate the battery. Embedded in one wall of the jacket is a heat exchanger in which there is circulated a refrigerant fluid derived from the air conditioner installed in the vehicle. The heat exchanger acts to cool the battery to maintain the temperature of the electrolyte therein at a level at which the battery operates at optimal efficiency.

BRIEF DESCRIPTION OF THE DRAWINGS

For a better understanding of the invention as well as other objects and features thereof, reference is made to the annexed drawings wherein:

FIG. 1 is a top view of a thermal jacket in accordance with the invention for accommodating an automobile storage battery, the jacket being associated with the air-conditioner unit of the auto;

FIG. 2 is a prospective view of the jacket;

FIG. 3 is a separable view of the heat exchanger included in one wall of the jacket; and FIG. 4 shows a jacket arrangement having embedded in one wall thereof a thermoelectric device to cool the battery, the device being powered by the battery.

DETAILED DESCRIPTION OF THE INVENTION

First Embodiment: Referring now to FIGS. 1 and 2 of the drawing, shown therein is a standard multi-cell, lead-acid storage battery 10 having output terminals 11 and 12 to provide the 12 volt output required for the dc powered devices in an automobile. As previously explained, the actual dc output of the battery depends on the existing temperature of its electrolyte, which temperature may be such as to reduce the output voltage.

Battery 10 is installed in the engine compartment of an automobile having an internal combustion engine. The concern of the present invention is with the heat emanating from the engine which when transferred to the electrolyte in the battery will overheat it, with a resultant impairment of the efficiency of the battery. Overheating of the electrolyte for prolonged periods may also shorten the life of the battery.

In order to maintain the electrolyte contained in battery 10 in a relatively cool state and thereby cause the battery to function at optimal efficiency so that its dc output voltage never falls below 12 volts, battery 10 is nested within a thermal jacket J whose rectangular structure is defined by a pair of long side walls 13 and 14 and a pair of shorter end walls 15 and 16. The side walls are bonded or otherwise joined to the end walls at the corners of the rectangle. The inner dimensions of jacket J substantially match the outer dimensions of battery 10. Hence to install the jacket, it is only necessary to telescope it over the battery.

The walls of jacket J are preferably composed of rigid, closed cell polyurethane foam plastic material having a high degree of thermal resistance and therefore acting as thermal insulation. The use of this material as thermal insulation is well known, as in the thermal insulation included in refrigerated appliances and vehicles.

Polyurethane resins are produced by the reaction of a disocyanate with at least two active hydrogen atoms, such as diole or diamine. In practice, other thermal insulating materials may be used, such as rigid polyvinyl foam. Embedded in wall 14 of the jacket is a heat exchanger 17 formed by a serpentine tube of thermally-conductive material, such as copper or aluminum. The successive U-shaped branches of the tube lie in a common plane parallel to the planar inner surface in wall 14. The heat exchanger is provided with an inlet 17A to receive a coolant fluid, and an outlet 17B from which the fluid is discharged.

Heat exchanger 17 is associated with a standard air conditioner unit 18 installed in the automobile. In a unit of this type, the cooling effect takes place in an evaporator where heat from the passenger compartment is absorbed by a low-pressure refrigerant vapor, such as FREON, the vapor being conveyed to a compressor where it is compressed to a high temperature, high-pressure gas. This gas is fed to a condenser in which it is condensed to a high-pressure liquid which flows through an expansion device. In this device it becomes a low-temperature, low-pressure vapor which is fed into the evaporator to complete the cycle. This low-temperature, low-pressure vapor in the first embodiment of the invention functions as the coolant which flows through the tubing of heat exchanger 17 in the thermal jacket J surrounding the storage battery.

Air conditioner unit 18, by way of a valve 19, is coupled to inlet 17A and outlet 17B of the heat exchanger 17 whereby the tubing of the heat exchanger is effectively interposed in the fluid line feeding low-temperature vapor into the evaporator of unit 18. When valve 19 is open, then the cold vapor from the unit flows through the heat exchanger in the jacket. But when valve 19 is closed, the heat exchanger is disconnected from the unit.

To thermostatically regulate the temperature of the battery which is being cooled by jacket, a heat-sensitive detector 20 is provided which is mounted in the jacket adjacent its inner surface to yield a signal whose magnitude depends on the temperature within the jacket.

The signal is conveyed to a thermostatic switch 21 which is arranged to actuate valve 19 when the temperature within the jacket reaches a predetermined level. At this point, valve 19 is opened to admit the cooling fluid into the heat exchanger to cool the battery.

Automatic control of the battery temperature is not essential, unless one wishes to maintain the temperature of the electrolyte at that temperature level at which the battery functions at its optimal efficiency. For the battery to function well, it is only necessary to prevent overheating of its electrolyte.

Second Embodiment: In the first embodiment of the invention, it is necessary to associate the jacket with the air conditioner installed in the vehicle whose engine compartment contains the battery.

In the embodiment of the jacket shown schematically in FIG. 4, the cooling means is incorporated in one wall of jacket J. It is constituted by a thermoelectric device of any known type. The typical thermoelectric device is formed of two semiconductive devices having dissimilar characteristics. These are connected electrically in series and are thermally connected in parallel to create two junctions, one being a cold junction and the other a hot junction.

One semiconductor is of the N-type and the other of the P-type. When a dc voltage is applied across the dissimilar semiconductors, the junction connecting the semiconductors in series to the d-c source becomes intensely cold, whereas the junction thermally connecting the conductors in parallel becomes hot.

Thermoelectric device 22 which acts to cool the battery derives its dc operating power from the battery itself. The device is situated in wall 14 of the jacket so that its cold junction 22C faces the battery. Heat from the hot junction of the device is absorbed by a heat sink (not shown).

To regulate the operation of thermoelectric device 22, the output of battery 10 is applied to this device through a thermostatic control switch 23. Coupled to this switch is a heat-sensitive detector 24 which senses the temperature of the battery within the jacket to produce a signal which activates switch 23 only when the electrolyte temperature exceeds a predetermined level.

When, therefore, thermoelectric device 22 is turned on by switch 23, it is then powered by battery 10 and serves to cool the battery to prevent overheating of its electrolyte. Thus the battery in effect is self-cooling. In practice, sensor 24 and control switch 23 may be embedded in wall 14 of the jacket, as well as its input terminals to be connected to the battery.

In the second embodiment, while the power to cool the battery is drawn from the battery itself, little power is required for this purpose in that the battery is thermally insulated from the engine which is the source of heat, and the volume within the jacket to be cooled is small.

While there has been disclosed preferred embodiments of the invention, it is to be understood that many changes may be made therein without departing from the spirit of the invention.

What is claimed is:

1. A thermal jacket adapted to accommodate a storage battery having an acid electrolyte, the battery being installed in the engine compartment of an automobile and being exposed to heat emanating from the engine which may raise the temperature of the electrolyte to a high level at which operation of the battery is impaired, said jacket comprising:

A. A rectangular structure having an interior dimensioned to accommodate said battery, said structure being defined by side and end walls formed of thermal insulation material which thermally isolate the battery from heat emanating from the engine; and B. means incorporated in said structure to cool the interior thereof to a degree maintaining the electrolyte of a temperature below said high level.

2. A jacket as set forth in claim 1, in which the walls thereof are fabricated of rigid, foam-plastic material having a high thermal resistance.

3. A jacket as set forth in claim 2, in which the foam plastic is closed-cell polyurethane foam.

4. A thermal jacket as set forth in claim 1, in which said cooling means includes a heat-exchanger embedded in one of said walls through which flows a coolant.

5. A thermal jacket as set forth in claim 4, in which said heat exchanger is formed by a serpentine tube formed by thermally-conductive material.

6. A jacket as set forth in claim 5 in which the coolant is derived from an air conditioner unit installed in the automobile.

7. A jacket as set forth in claim 6 further including a detector to sense the temperature in the interior of the structure to produce a signal to regulate the flow of coolant in the heat exchanger.

8. A jacket as set forth in claim 1 in which the cooling means is a thermoelectric device incorporated in said structure and having a cold junction adjacent said battery.

9. A jacket as set forth in claim 8 in which dc power for operating said device is derived from the battery.

* * * * *